July 14, 1936.  V. A. ROHLIN  2,047,291
WATER PURIFYING AND DEGASIFYING APPARATUS
Original Filed Dec. 19, 1932   3 Sheets-Sheet 3
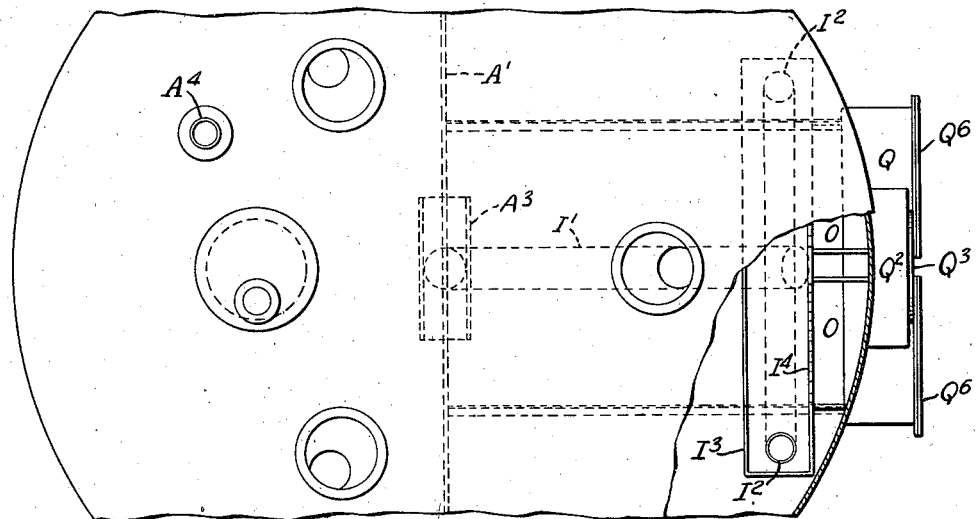
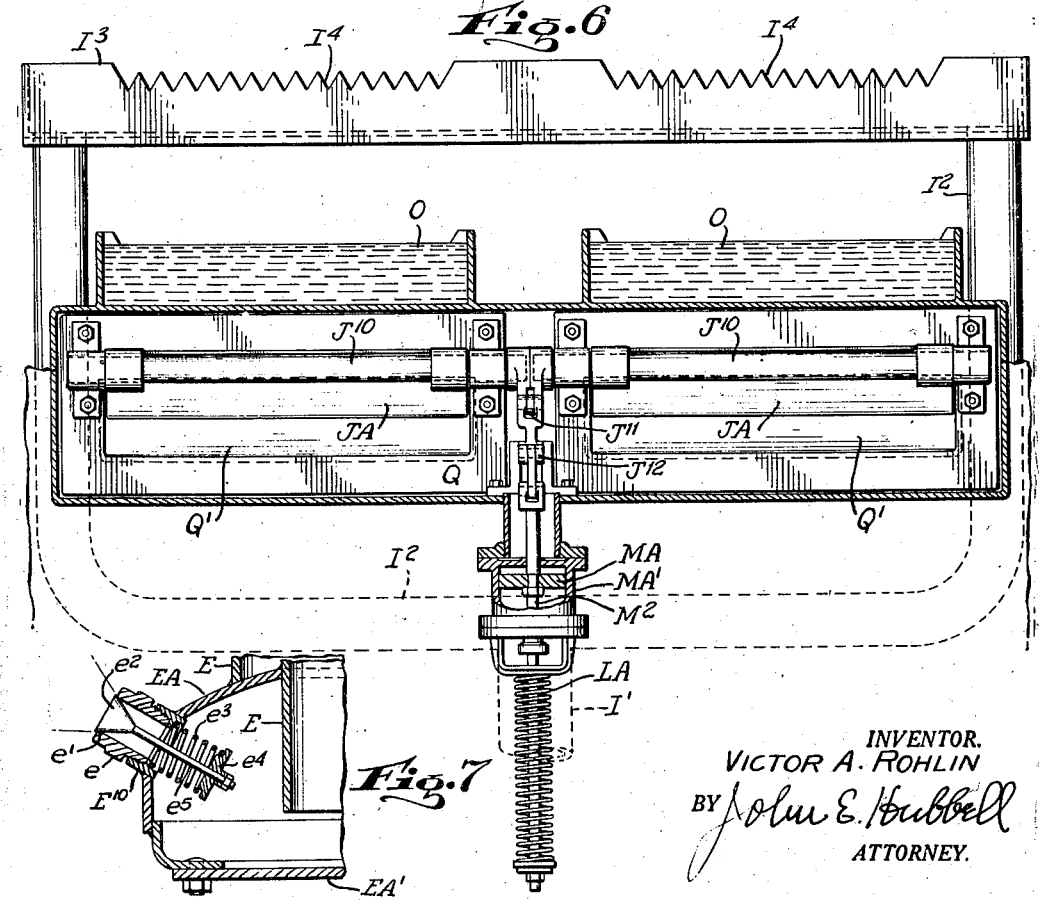
INVENTOR.
VICTOR A. ROHLIN
BY John E. Hubbell
ATTORNEY.

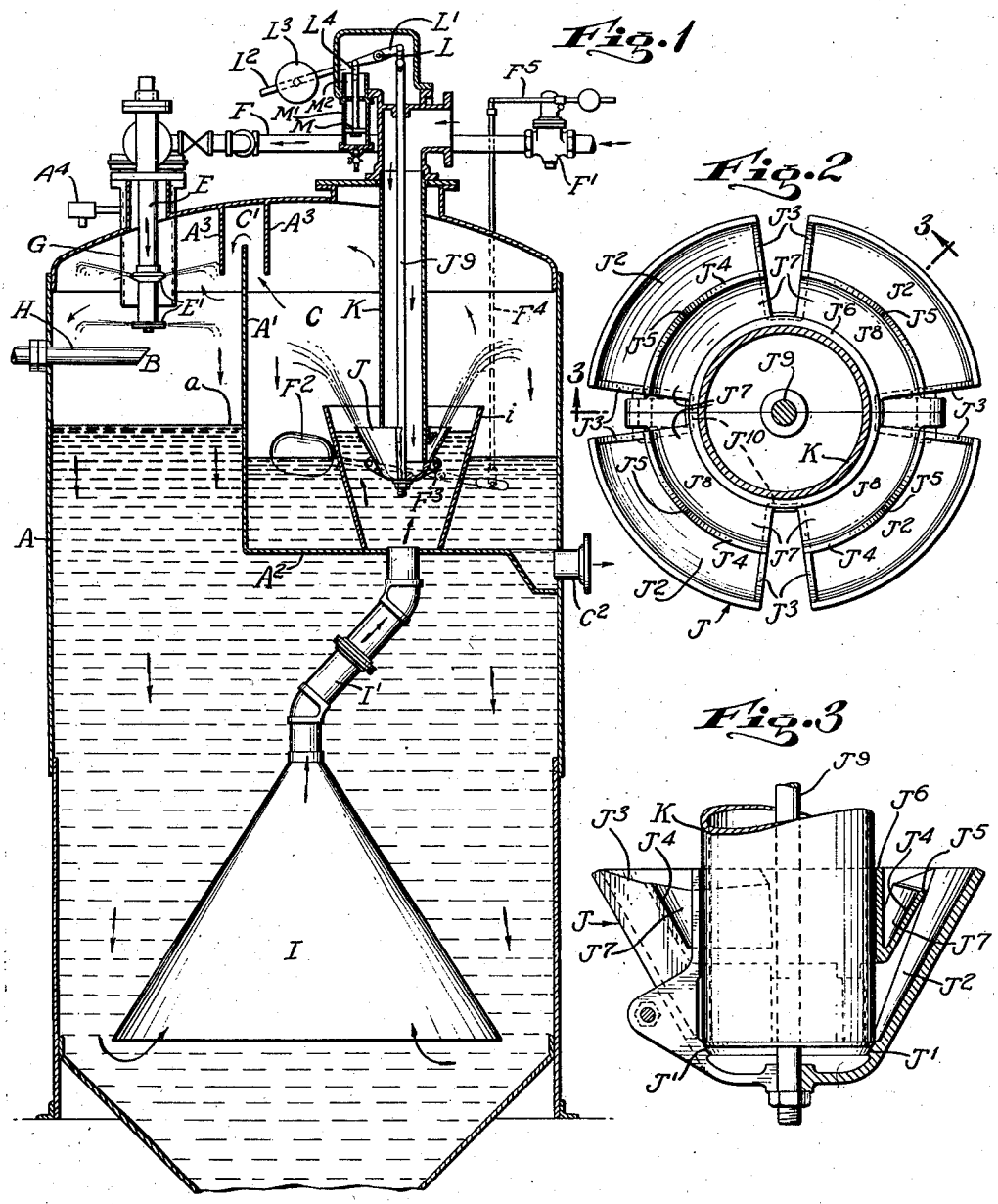
July 14, 1936. V. A. ROHLIN 2,047,291
WATER PURIFYING AND DEGASIFYING APPARATUS
Original Filed Dec. 19, 1932 3 Sheets—Sheet 1
INVENTOR.
VICTOR A. ROHLIN
ATTORNEY.

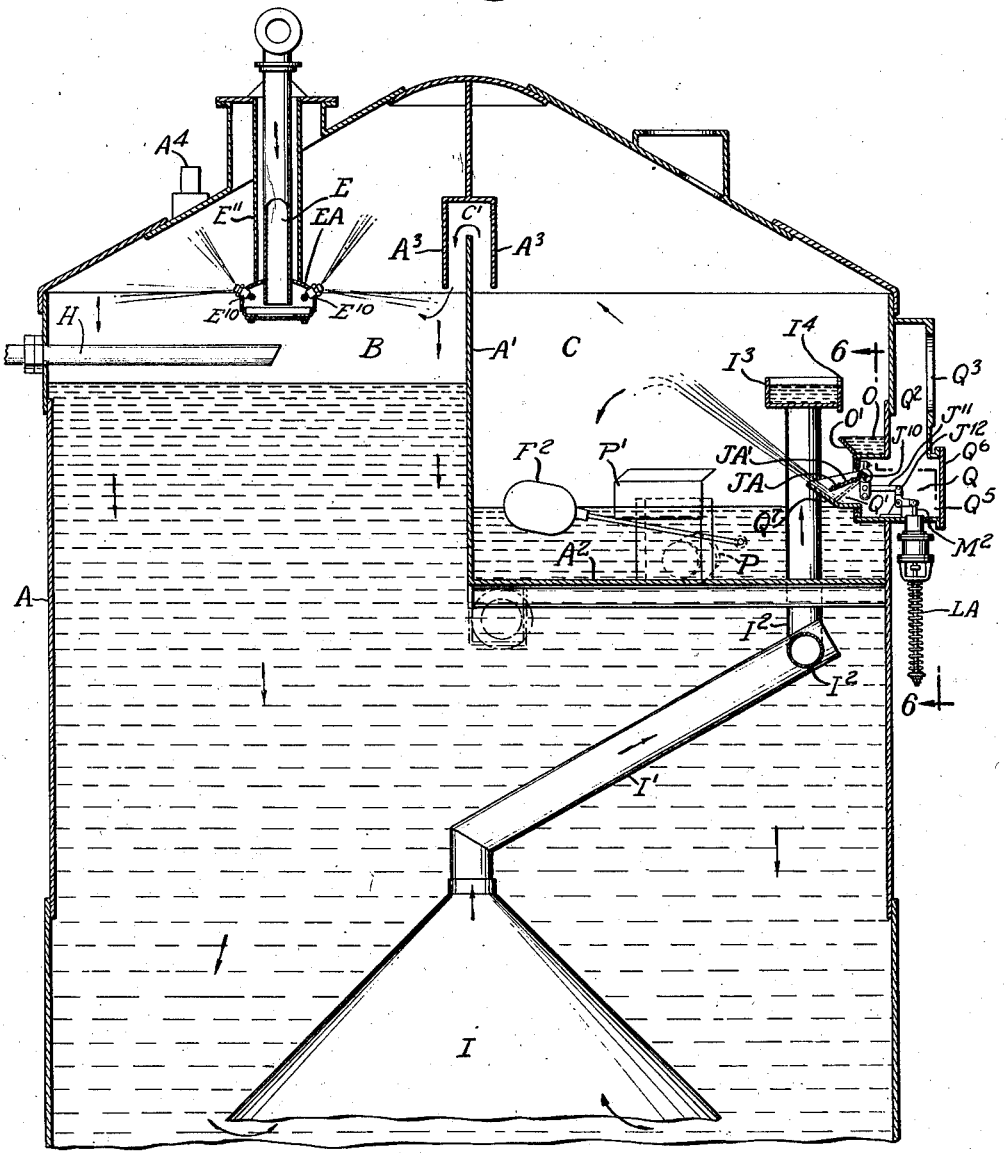

Patented July 14, 1936

2,047,291

UNITED STATES PATENT OFFICE 2,047,291

WATER PURIFYING AND DEGASIFYING APPARATUS

Victor A. Rohlin, Philadelphia, Pa., assignor to Cochrane Corporation, Philadelphia, Pa., a corporation of Pennsylvania Application December 19, 1932, Serial No. 647,878
Renewed January 3, 1936

14 Claims. (Cl. 210—14)

The general object of the present invention is to provide improved means for heating, for purifying and for deaerating or, more accurately, for degasifying water for boiler feed and analogous purposes. More specifically, the object of the present invention is to provide improved apparatus for subjecting water to a so-called hot process water softening treatment and to a degasifying treatment separating from the water the air initially contained therein and the gases liberated from the water by said treatment.

My present invention is characterized primarily by the fact that means for subjecting the water to a preliminary heating treatment and water softening treatment are effectively combined with means for degasifying and further heating the softened water by steam which subjects the water to an atomizing action, and all of which, except the small portion condensed in said atomizing action, along with the air and other gases liberated from the water by said action is utilized in the preliminary water heating operation. In preferred practical embodiments of the invention, the initial heating, the softening and the atomizing and degasification treatments are all carried out in a single tank structure enclosing the relatively large sedimentation space required, and having its upper portion partitioned to form an initial steam and water contact heating space, alongside a degasification chamber separated from both of said spaces, except for an inlet for the gravity flow of water into said chamber from the sedimentation space and a steam and gas outlet to the initial heating space.

The invention is further characterized by the provision of means for so regulating the amount of water maintained in the apparatus and for so supplying the atomizing steam used that a gravity movement of the water out of the sedimentation space will bring it into the path of the atomizing steam jet flow and that the latter will give an upward movement to the atomized water so that the water level in the storage space of the degasification chamber may normally be but little below the main water level in the tank and the atomizing and degasifying operation results in but a trifling loss in water head.

The practical importance of the small loss of water head thus made possible will be realized when account is taken of the relatively great bulk and height of hot process water purification apparatus units. The sedimentation tank structure of such a unit quite commonly is fifteen or twenty feet or more in diameter, and has a vertical dimension of twenty to thirty feet, and the location of ordinary forms of water heating and degasifying structures above the sedimentation space would extend the vertical dimension of the unit upwardly for a distance which might well be ten or fifteen feet or more. The location of the heating and degasifying means within the tank enclosing the sedimentation space in accordance with the present invention results in an appreciable economy in the space requirement of a unit of given capacity, and reduces its maximum vertical dimension to the sum of that required for sedimentation and for the initial water heating treatment, since the body of water undergoing sedimentation extends and in effect forms the bottom of the initial water heating space.

The height to which the water must be pumped to move it through my improved apparatus is thus reduced practically to the minimum possible, and practically all of the water head created in elevating the water into the apparatus is available for use in passing water from the apparatus into a boiler or other receiving apparatus directly, or more usually, through the filter means required to eliminate the portion of the precipitated impurities not settling out of the water in the sedimentation space.

The degasifying portion of my improved apparatus may be relatively compact as the water loses little heat in passing to it from the initial heating space, so that the heating duty of the degasifying apparatus is relatively light, and its continuous operation at practically maximum efficiency is not interfered with by any accumulation of solid impurities from the water, since the portion of the impurities which the water carries out of the sedimentation space and into the degasifying apparatus is in such form that it passes out of the degasifying apparatus with the water discharged therefrom.

The direct passage of the water from the initial heating space into the sedimentation space through a horizontal flow area which may be the full horizontal area of the said heating space practically precludes any significant reduction of said flow area by the accumulation of deposited impurities. Moreover, when the initial heating action is effected in the preferred manner by spraying the water to be heated and treated into the steam filled heating space B, the deposit of precipitated impurities is mainly restricted to deposit on the walls and in the sludge collecting bottom portion of the sedimentation space from which they can be removed in the same manner, and with no more difficulty, than is involved in the operation of any ordinary hot process water purifying unit not provided with self contained water heating and degasifying means.

My improved apparatus is characterized not only by its compactness, but also by inherent simplicity in construction and arrangement, and is inherently relatively inexpensive to construct and maintain.

The various features of novelty which characterize my invention are pointed out with particularity in the claims annexed to and forming a part of this specification. For a better understanding of the invention, however, and the advantages possessed by it reference should be had to the accompanying drawings and descriptive matter in which I have illustrated and described a preferred embodiment of the invention.

Of the drawings:

Fig. 1 is a somewhat diagrammatic sectional elevation of one embodiment of the present invention;

Fig. 2 is a plan view of the atomizing device employed in Fig. 1;

Fig. 3 is a section on the broken line 3—3 of Fig. 2;

Fig. 4 is a sectional elevation of a second embodiment of the invention;

Fig. 5 is a partial plan view, with parts broken away and in section, of the apparatus shown in Fig. 4;

Fig. 6 is a partial elevation, taken at right angles to, and partly in section on the line 6—6 of Fig. 4; and Fig. 7 is a section on a larger scale than Fig. 4, of a portion of the apparatus shown in Fig. 4.

In the drawings, and referring first to the construction shown in Figs. 1, 2 and 3, A represents a tank in which the water heating, chemical treating, settling, and degasifying operations are performed. The upper portion of the space within the tank A is divided into an initial water heating space B and a degasifying chamber or compartment C. As shown, the compartments B and C are separated from one another by a vertical partition $A'$. The latter extends downward to a level below the normal water level where the partition $A'$ is connected to a horizontal partition or wall $A^2$ which forms the bottom wall of the compartment C. The bottom of the space B is formed in effect by the water body in the sedimentation space which occupies all of the tank interior, except that portion forming the space B and chamber C. Steam supplied to the compartment C, and not condensed therein, along with gases liberated from the water within the compartment C, passes from the latter into the space B through a port $C'$ in, or above the upper edge of, the partition $A'$. Baffle plates $A^3$, one at each side of the partition $A'$, impede the passage of water spray or entrained water between the compartment C and the space B through the port $C'$. The heated, purified and degasified water passes away from the tank A to the filter, boiler feed pump or other receiver for such water, through an outlet $C^2$ opening from the bottom of the compartment C.

As shown in Fig. 1, the water treated in the tank A is discharged into the space B through a spray device comprising a vertical spray pipe E extending downward into the space B through the top wall of the tank A and formed within the space B with suitable upper and lower spray orifices $E'$. The water is supplied to the spray pipe E through a supply pipe F, which includes a control valve $F'$. The latter is adjusted by a float $F^2$ floating on the water in the compartment C and connections between the float $F^2$ and the valve lever $F^5$ shown as comprising a rock shaft $F^3$ and a link $F^4$ as required to supply the demand for water withdrawn from the compartment C through the outlet $C^2$.

Ordinarily and preferably, the pipe F is connected to the spray pipe E through the water passages of a vent condenser G employed to condense the water vapor passing in admixture with the liberated gases from the space B to the air and gas space of the vent condenser, from which the gases, along with any uncondensed vapor, are discharged through the vapor outlet $A^4$ ordinarily into the atmosphere. The vent condenser may be located within the tank A, or may be wholly external to the tank A. The details of construction and arrangement of the vent condenser require no specific illustration or description herein, as they may follow the usual and well known practice of the water deaeration art.

The water sprayed into the space B is heated by contact with the steam entering that space through the port $C'$ to a temperature which ordinarily will be about 5° or so below the temperature at which steam is supplied to the chamber C. The water so heated in the space B rains down into the body of water extending from the bottom of the space B to the bottom of the tank A. Adjacent the bottom of the space B, the heated water comes into contact with the chemical reagent or reagents, the latter being supplied as shown through the usual supply pipe H extending into the tank A. Ordinarily the reagent material supplied by the pipe H is a liquid carrying soda ash and hydrate of lime partly in solution and partly in suspension. No necessity exists for illustrating and describing the means for supplying the reagent material to the pipe H, as those means may be constructed and arranged in well known ways commonly used in hot process water purification systems.

The water and reagent material raining down through the space B into the body of water beneath that space, passes slowly downward to the open lower end of the inverted hollow cone or funnel I centrally located within the tank A, and then passes upward through said funnel to the outlet at its upper end. A pipe $I'$ connected to that outlet passes the water into the compartment C. The solid impurities precipitated from the water by its heating and the action of the reagent material supplied by the pipe settle out of the water as is usual during the slow flow of the water downward outside of the cone I and upward through said cone. The bottom wall of the tank A is conical, and in accordance with the usual practice in the hot process water purification art, should be provided at its bottom with a valved sludge take-off, (not shown).

The pipe $I'$ discharges at its upper end into a chamber or basin $i$ within the compartment C, the side wall of which, as shown, is in the form of a section of a hollow cone, the smaller lower end of which rests upon and is secured to the partition $A^2$, while its open larger end extends to a level above the water level maintained in the surrounding portion of the compartment C by the float $F^2$. Within the basin $i$ the water is subjected to a steam atomizing action, by which the water is heated to the temperature of the atomizing steam, and by which the water is swept upwards out of said basin in the form of a spray so fine that it may properly be referred to as a fog or mist.

The means for atomizing the water entering the chamber $i$, comprises a spray head J of inverted bell or cup form which is carried by a rod $J^9$. The latter is shown as axially disposed within a steam supply pipe K, which extends downwardly into the compartment C through the top wall of the tank A, and which has its lower end beveled for engagement with the conical valve seat $J'$ formed on the inner wall of the member J adjacent the lower end of the latter. The steam, which in normal operation is discharged from the pipe K through the space between its lower end and the seat $J'$, is delivered into the lower ends of channels $J^2$ formed in the atomizer J. As shown, there are four channels $J^2$, each of which in horizontal cross section is an annular arc of a little less than 90°. The outer wall of each channel $J^2$ is formed by the conical outer shell portion of the chamber J. The adjacent walls $J^3$ of adjacent channels $J^2$ are shown as radial, and the inner wall $J^4$ of each channel is shown as formed by a section of a hollow cone coaxial with the outer wall of the member J. Each wall $J^4$ terminates at its upper end in a weir edge $J^5$ and merges at its lower end into a tubular portion $J^6$, which forms a guide sleeve receiving the pipe K.

The adjacent end walls $J^3$ of adjacent channels are spaced apart to form radial water inlet channels $J^7$ open at their outer edges. These channels supply water to the adjacent ends of troughs $J^8$, there being one of these troughs between the inner wall $J^4$ of each channel $J^2$ and the adjacent portion of the sleeve $J^6$. Advantageously and as shown, the upper weir edge $J^5$ of each wall $J^4$ is downwardly inclined slightly from each end towards its middle, so that at low loads the water inflow into the channel $J^2$ is concentrated at the central portion of that channel, whereas at heavier loads the inflow of water to each channel is distributed along the whole length of the wall $J^4$. At overloads water may enter each channel $J^2$ over the downwardly inclined upper edges of the corresponding end walls $J^3$ and over the horizontal upper edge of the outer wall of the channel.

The member J is subjected through its supporting rod $J^9$ to a valve seating force adequate to insure the desired jet velocity of steam discharge through the annular space between the lower end of the pipe K and the seat $J'$, the member J thus serving in effect as a loaded back pressure valve controlling the downflow of steam through the pipe J. The pressure drop past said valve or excess of pressure in the pipe K over that in the compartment C may obviously vary with conditions of use, and under ordinary conditions may well be in the neighborhood of a pound per square inch. The magnitude of that pressure is determined in the apparatus shown in Fig. 1 by the action of valve loading means comprising a rock shaft L carrying a lever arm $L'$, to which the upper end of the rod $J^9$ is link connected, and having an oppositely extending lever arm $L^2$ which carries an adjustable counterweight $L^3$. Another lever arm $L^4$ carried by the rock shaft L is link connected to the upper end of the stem of a dashpot piston M working in a dashpot chamber $M'$ and operating to minimize any tendency to chattering movement or slamming of the device J. A cup like extension $M^2$ at the upper end of the chamber $M'$ collects water of condensation and thereby keeps the chamber $M'$ filled with liquid.

In respect to the initial heating of the water, the addition of reagent material thereto, and the elimination of impurities therefrom by sedimentation, the apparatus disclosed in Figs. 1 to 3 does not differ from ordinary hot process water softening apparatus except in respect to the economy in space requirements and the avoidance of heat losses resulting from the incorporation of the initial heating space in the tank enclosing the sedimentation space. The degasifying operation, however, is characterized by the effectiveness of the steam atomizing provisions, which break up the water into drops of mist or fog-like dimensions. From such small drops the air and other gases driven out of solution in the water composing them as a result of the fact that the water is heated practically to the full temperature of the atomizing steam, may quickly reach the surface of the drops and escape from the latter. Any small gas portions retained by water drops impinging against the roof or side walls of the degasifying compartment have further and ample opportunity to escape from the water as the latter falls in drops from the roof or is deflected in drop form from said side walls or runs down the latter in thin films.

The whole interior of the tank space is effectively used at all times partly for water storage purposes and partly to provide steam spaces for heating and degasifying the water. The water level in the portion of the compartment C surrounding the basin $i$ rises and falls as required to give the float $F^2$ a suitable control range of movement between its upper light load and lower heavy load positions. While the water level in basin $i$ falls relative to the level in space B slightly as the load increases, the parts may be so proportioned that this fall in water level is quite small. The water level in space B indicated by line $a$ in Fig. 1, varies but little with changes in load, as but little loss of head is required to maintain the heaviest load flow of water into the channels $J^4$. Moreover, such loss of head is compensated for somewhat by the fact that the member J is lowered as the load is increased. The energy required to lift the water from the steam spray device J into the space above the basin $i$ is furnished by the atomizing steam and adds nothing to the load on the pumping machinery required to put the water into the apparatus through the supply pipe F and spray pipe E. The high efficiency of the degasifying apparatus due to its atomizing action and to its freedom from the deposit of impurities therein, permit the degasifying apparatus to be of relatively small bulk, and thereby contributes to economy in construction cost, in space occupied and in heat losses to the external atmosphere.

The general principles of the present invention may obviously be employed in apparatus differing in various respects from that shown in Figs. 1–3. In particular the means shown in Figs. 1–3 for spraying the water into the initial heating space and for subjecting the water to the atomizing action of the steam may well be replaced in units of relatively large size by water spraying and atomizing means of the character illustrated in Figs. 4–7. In those figures parts which may be similar in form to corresponding parts shown in Figs. 1–3, are designated by the same reference symbols. The means shown in Figs. 4 and 7 for spraying water into the initial heating space comprises a spray chamber EA carried by and into the lower end of which the spray supply pipe E extends. From the chamber EA the water is discharged through a plurality of outlets. As shown each outlet comprises a tubular part $E^{10}$ extending through and anchored in the wall of the chamber EA, and internally threaded at its outer end to removably receive the tubular body part $e$ of a corresponding spray unit. The element $e$ is threaded into a corresponding part $E^{10}$, and is formed at its outer end with a conical seat $e'$ for a corresponding conical member $e^2$ urged toward said seat by a spring $e^3$ acting between the inner side of an internal flange or shoulder carried by the member $E^{10}$ and an adjustable spring abutment $e^4$ carried by the stem $e^5$ of the member $e'$. The pressure of the water within the chamber EA moves each part $e^2$ away from its seat $e'$ against the tension of the corresponding spring $e^3$, as required to maintain the water pressure in the chamber EA in excess of the pressure in the space B, by an approximately constant amount so as to insure the proper spray discharge, when the load or rate of supply is relatively heavy, as well as when it is relatively light. Advantageously and as shown, the axis of the spray discharge through each outlet is in a plane radial to the pipe E and is upwardly inclined from the horizontal.

To avoid any significant heating of the water within the pipe E with consequent deposit of impurities on the inner wall of that pipe, the latter is advantageously insulated against heat transfer by a dead air space between the pipe E and a surrounding jacket E''. That air space is closed at its lower end, but is open to the atmosphere at its upper end. To permit the removal of impurities depositing from the water within the chamber EA, the latter is preferably provided with a removable bottom wall EA'.

In the construction shown in Figs. 4, 5 and 6 the pipe I' leading from the upper end of the cone I is bifurcated at its upper end. Each bifurcation $I^2$ passes vertically through the bottom wall $A^2$ of the compartment C, and discharges at its upper end into the corresponding end of a horizontal water distributing trough $I^3$ supported by the bifurcation and located above the water level in the compartment C. The side of the trough $I^3$ adjacent the wall of the tank A has its upper edge shaped to form two end to end serrated weir edges $I^4$ below the remaining upper edge portions of the trough and over which the water entering the trough is discharged from the latter. The water discharged over each weir edge $I^4$ is received in a corresponding trough O, the outer side of which is formed by the adjacent portion of the side wall of the tank A and the inner wall O' of which is inclined away from the tank wall and overhangs a corresponding plate like member JA. Each member JA serves as a splash plate to break up and divert the water falling onto its upper side from the trough above it, and also serves the same steam throttling or back pressure valve purpose served by the previously described spray device J.

As shown each member JA is a rectangular plate like flap valve and both members are connected at their upper edges to the same horizontal valve shaft $J^{10}$. Each member JA controls the velocity of discharge of steam into the compartment C through a corresponding rectangular outlet port Q' from a common steam supply box or valve body Q. The latter is shown as a box of rectangular cross section extending through and welded to the tank wall.

The box Q receives steam through an aperture in its upper wall from a steam supply chamber or channel $Q^2$. The latter, as shown is formed by a portion of the tank wall and by plates welded thereto, and is formed with an inlet $Q^3$, to which a steam supply pipe may be attached. At its outer side, the box Q is formed with openings $Q^5$ which permit access to the valves JA and their operating mechanism are normally closed by cover plates $Q^6$.

Between the two valve members JA, their common supporting shaft $J^{10}$ carries a downwardly extending crank arm. The latter is connected by a link $J^{11}$ to one arm of a bell crank lever $J^{12}$ journalled within the box Q and having a second arm link connected to the stem $M^2$ of a dashpot piston MA working in a dashpot chamber MA' beneath the steam box. The dashpot piston stem $M^2$ is extended downwardly below the dashpot piston and at its lower end carries an abutment for a loading spring LA serving the function of the counterweight L shown in Fig. 1. The spring LA tends to hold each valve member JA in the dotted line position shown in Fig. 4, in which its edge engages an upwardly inclined bottom wall of corresponding trough like parts $Q^7$ secured to the box Q, and each forming bottom and side wall extensions of the corresponding port Q' which is effectively closed in the dotted line position of the corresponding member JA. The opposing pressure of the steam moves the valve member JA toward or through the full line position shown as required to permit the required steam flow. The latter is determined by and varies with the rate at which water is supplied through the spray head EA, and the resultant steam condensing action.

In the operation of the apparatus shown in Figs. 4 to 7, the water overflows from the box $I^3$ into the troughs O, the bottom walls of which, as shown, are formed by the box Q, and flowing from the troughs O over the side edges O' of the latter, falls onto the downwardly inclined upper sides of the valve members JA. To facilitate the breaking up of the water falling on the members JA, the latter may be formed with projections JA' at their upper sides. Some of the water falling onto the plates JA splashes off the latter in the form of drops which eventually move into the path of the steam issuing from the supply ports Q', but the bulk of the water falling on the plates JA, moves in a more or less divided form to the lower edge of the latter, and then drops directly into the corresponding steam stream, by which the water is effectively atomized.

The steam atomizing provisions illustrated in Figs. 4, 5 and 6 are better adapted than are those shown in Figs. 1, 2 and 3 for use in relatively large units requiring a corresponding large volume of steam and steam flow passages of correspondingly large cross section. The water level in the compartment C is necessarily kept below the discharge ends of the steam supply port extensions formed by the members $Q^7$. Moreover, with the means for passing the water onto the valve members JA from the supply box $I^3$, shown in Figs. 4, 5 and 6, the latter must be located at some distance above the water level in the compartment C, and the water level in the space B must be correspondingly elevated above the water level in the compartment C. The difference in elevation is relatively small, however, in comparison with the total vertical dimensions of the apparatus, and the height to which the water must be pumped to introduce it into the apparatus, and a compensating advantage is obtained, moreover, by the preliminary degasification to which the water is subjected as it passes through the steam atmosphere in the compartment C from the box I³ to the troughs O, and from the latter onto the valve plates JA.

To prevent flooding of the atomizing provisions under abnormal conditions, with either form of apparatus illustrated herein, the compartment C may be provided with suitable overflow provisions limiting the height of water level therein. An overflow outlet P provided for this purpose, is shown in Fig. 4. A discharge trap (not shown) may be connected to the outer end of the outlet port P, as is usual in connection with the overflow provisions commonly employed with open water heaters. P' represents a hood preventing falling drops of water in the chamber from passing directly to the chamber C. The novel method of operation disclosed but not claimed herein, is claimed in my co-pending application, Serial Number 32,330, filed July 20, 1935, which discloses apparatus of the form disclosed herein and discloses and claims apparatus of a different form suitable for use in the practice of said method.

While in accordance with the provisions of the statutes, I have illustrated and described the best form of embodiment of my invention now known to me, it will be apparent to those skilled in the art that changes may be made in the form of the apparatus disclosed without departing from the spirit of my invention as set forth in the appended claims and that in some cases certain features of my invention may be used to advantage without a corresponding use of other features.

Having now described my invention, what I claim as new and desire to secure by Letters Patent, is:

1. Water purifying and deaerating apparatus comprising in combination, a treatment chamber having a submerged water outlet and a separate unsubmerged air and vapor outlet, an outflow chamber, and a deaerating steam jet atomizer delivering water from said water outlet to said outflow chamber.

2. Water purifying and deaerating apparatus comprising in combination, a treatment chamber having a submerged water outlet and a separate unsubmerged air and vapor outlet, an outflow chamber, a deaerating steam jet atomizer delivering water from said water outlet to said outflow chamber, means supplying atomizing steam to said atomizer, and means for utilizing steam passing through said atomizer in heating the water in said treatment chamber.

3. Water heating and deaerating apparatus, comprising in combination, a treatment chamber having a submerged water outlet and a separate unsubmerged air and vapor outlet, an outflow chamber, a deaerating steam jet atomizer delivering water from said water outlet to said outflow chamber, and means regulating the supply of water to said treatment chamber in accordance with the amount of water in said outlet chamber.

4. Water purifying and degasifying apparatus comprising in combination a tank having a degasifying compartment in its upper portion and an outlet from said compartment for treated water, and having a heating chamber alongside said compartment and open at its lower end and an outlet from said chamber for vapor and gas, a passage for the flow of water from the lower portion of the tank space into said compartment opening to the latter intermediate the top and bottom thereof, means discharging water into said chamber to maintain a water flow therein high enough to insure a level of water into said compartment through said passage corresponding to the outflow of water through said outlet whereby all of the tank space exterior to said compartment and below said water level forms a water storage and sedimentation space, and means supplying steam to said compartment including atomizing means subjecting the water entering said compartment to an atomizing action, said compartment having an outlet through which steam and gas pass into said chamber and heat the water discharged thereinto.

5. In water purifying and deaeration apparatus, the combination with a tank structure enclosing a sedimentation space constituting the major portion of the tank interior, of partition means dividing the upper portion of the tank space into a degasifying compartment and an initial heating chamber alongside said compartment and open at its lower end to the said sedimentation space, said compartment having an outlet for treated water and an inlet for a gravity inflow of water from said sedimentation space, means within said compartment and associated with said inlet for subjecting the water entering through said inlet to the atomizing action of an upwardly directed steam flow, an outlet to said chamber from said compartment for steam and liberated gases, vent means for discharging gases from said heating chamber, and means for supplying water to be treated to said chamber as required to normally maintain a water level therein above the level at which the atomizing steam is discharged.

6. In water purifying and deaerating apparatus, the combination with a tank structure enclosing a sedimentation space constituting the major portion of the tank interior, of partition means dividing the upper portion of the tank space into a degasifying compartment and an initial heating chamber alongside said compartment and open at its lower end to the said sedimentation space, said compartment having an outlet for treated water and an inlet for a gravity inflow of water from said sedimentation space, means within said compartment and associated with said inlet for subjecting the water entering through said inlet to the atomizing action of an upwardly directed steam flow, an outlet to said chamber from said compartment for steam and liberated gases, said last mentioned means including means automatically throttling the steam discharge to maintain an atomizing steam velocity as the amount of steam supplied varies, vent means for discharging gases from said heating chamber, and means for supplying water to be treated to said chamber as required to normally maintain a water level therein above the level at which the atomizing steam is discharged.

7. In water purifying and deaeration apparatus, the combination with a tank structure enclosing a sedimentation space constituting the major portion of the tank interior, of partition means dividing the upper portion of the tank space into a degasifying compartment and an initial heating chamber alongside said compartment and open at its lower end to the said sedimentation space, said compartment having an outlet for treated water and an inlet for a gravity inflow of water from said sedimentation space, means within said compartment and associated with said inlet for subjecting the water entering through said inlet to the atomizing action of an upwardly directed steam flow, an outlet to said chamber from said compartment for steam and liberated gases, said last mentioned means including means automatically throttling the steam discharge to maintain an atomizing steam velocity as the amount of steam supplied varies and dashpot means regulating the action of the throttling means, vent means for discharging gases from said heating chamber, and means for supplying water to be treated to said chamber as required to normally maintain a water level therein above the level at which the atomizing steam is discharged.

8. Water purifying and degasifying apparatus comprising in combination, a tank having a degasifying compartment in its upper portion and an outlet from said compartment for treated water, and having a heating chamber alongside said compartment and open at its lower end and an outlet from said chamber for vapor and gas, a passage for the flow of water from the lower portion of the tank space into said compartment terminating at its discharge end in a basin enlargement having its open upper end at a level intermediate the top and bottom of said compartment, means discharging water into said chamber to maintain a water level therein corresponding to a water level in said compartment intermediate the bottom of said compartment and the upper end of said enlargement, means within said enlargement discharging water heating and atomizing steam upwardly into said compartment from a level below the top of said enlargement whereby the water supplied to said compartment through said passage is atomized and carried out of said passage by the steam, said compartment having an outlet through which steam and gas pass into said chamber.

9. Water purifying and degasifying apparatus comprising in combination a degasifying compartment with an outlet for treated water, a heating chamber alongside said compartment, a water storage and sedimentation space receiving water from said chamber, a passage for the flow of water from said space into said compartment terminating at its upper end in a basin, a steam supply pipe extending downward into said basin, a member associated with the lower end of said pipe to regulate the discharge of steam therefrom and having upwardly directed channels receiving steam at their lower ends from said pipe and means for passing the water entering through said passage into the path of the steam discharged from said channels in divided form whereby the water is atomized and swept out of said basin into the upper portion of said compartment by the steam, and means supplying water to the heating chamber in accordance with the flow of water through said outlet, said compartment having an outlet through which steam and gas pass into said chamber and heat the water supplied thereto, and said chamber having a vent outlet for liberated gases.

10. Water purifying and degasifying apparatus comprising in combination, a degasifying compartment with an outlet for treated water, a heating chamber alongside said compartment, a water storage and sedimentation space receiving water from said chamber, a passage for the flow of water from said space into said compartment terminating at its upper end in a basin, a steam supply pipe extending downward into said basin, a member associated with the lower end of said pipe to regulate the discharge of steam therefrom and with flattened upwardly directed channels receiving steam at their lower ends from said pipe and over the upper edges of which the water entering through said passage passes into the path of the steam discharged by said channels in divided form whereby the water is atomized and swept out of said basin into the upper portion of said compartment by the steam, and means supplying water to the heating chamber in accordance with the flow of water through said outlet, said compartment having an outlet through which steam and gas pass into said chamber and heat the water supplied thereto, and said chamber having a vent outlet for liberated gases.

11. Water purifying and degasifying apparatus comprising in combination, a degasifying compartment with an outlet for treated water, a heating chamber alongside said compartment, a water storage and sedimentation space receiving water from said chamber, a passage for the flow of water from said space into said compartment terminating at its upper end in a basin, a steam supply pipe extending downward into said basin, a member associated with the lower end of said pipe to regulate the discharge of steam therefrom and with upwardly directed channels receiving steam at their lower ends from said pipe and means for passing the water entering through said passage into the path of the steam discharged by said channels in divided form whereby the water is atomized and swept out of said basin into the upper portion of said compartment by the steam, means supplying water to the heating chamber in accordance with the flow of water through said outlet, said compartment having an outlet through which steam and gas pass into said chamber and heat the water supplied thereto, and said chamber having a vent outlet for liberated gases, and means subjecting said member to a steam throttling force to maintain a pressure in said pipe exceeding the vapor pressure in said compartment by a predetermined amount.

12. Water purifying and degasifying apparatus comprising in combination, a degasifying compartment with an outlet for treated water, a heating chamber alongside said compartment, a water storage and sedimentation space receiving water from said compartment, a passage for the flow of water from said space into said compartment terminating at its upper end in a distribution box from which water overflows in divided form, means supplying steam to said compartment provided with a discharge passage opening upwardly into said compartment, a flap valve obstructing flow through said steam inlet and having a downwardly inclined upper side receiving and distributing water overflowing from said box, means subjecting said valve to a yielding closing force whereby a sufficient velocity of the steam entering the compartment is maintained to subject the water supplied through said box to an atomizing action, said compartment having an outlet through which steam and gas pass into said chamber to heat the water therein and said chamber having a vent outlet for liberated gases, and means supplying water to said chamber in accordance with the outflow of water through the first mentioned outlet.

13. Water purifying and degasifying apparatus comprising in combination, a degasifying compartment with an outlet for treated water, a heating chamber alongside said compartment, a water storage and sedimentation space receiving water from said compartment, a passage for the flow of water from said space into said compartment terminating at its upper end in a distribution box from which water overflows in divided form, means supplying steam to said compartment provided with a discharge passage opening upwardly into said compartment, a flap valve obstructing flow through said steam inlet and having a downwardly inclined upper side receiving and distributing water overflowing from said box, means interposed between said box and valve retarding and breaking up the flow of water onto said valve from said box, means subjecting said valve to a yielding closing force whereby a sufficient velocity of the steam entering the compartment is maintained to subject the water supplied through said compartment to an atomizing action, said compartment having an outlet through which steam and gas pass into said chamber to heat the water therein and said chamber having a vent outlet for liberated gases, and means supplying water to said chamber in accordance with the outflow of water through the first mentioned outlet.

14. Water purifying and degasifying apparatus comprising in combination, a tank having a degasifying compartment in its upper portion and an outlet from said compartment for treated water, and having a heating chamber alongside said compartment and open at its lower end and an outlet from said chamber for vapor and gas, a passage for the flow of water from the lower portion of the tank space into said compartment opening to the latter intermediate the top and bottom thereof, means discharging water into said chamber to maintain a water level therein high enough to insure a flow of water into said compartment through said passage corresponding to the outflow of water through said outlet whereby all of the tank space exterior to said compartment and below said water level forms a water storage and sedimentation space, and means supplying steam to said compartment including atomizing means from which the steam issues with upwardly directed jet velocity traversing the path of the water supplied to said compartment through said passage thereby subjecting the water to an atomizing action, said compartment having an outlet through which steam and gas pass into said chamber and heat the water discharged thereinto, and means for adding purifying reagent material to the water passing downward through the lower end of said chamber.

VICTOR A. ROHLIN.